United States Patent [19]
Yasuda

[11] Patent Number: 5,166,704
[45] Date of Patent: Nov. 24, 1992

[54] LASER WRITING DEVICE FOR IMAGE FORMING EQUIPMENT

[75] Inventor: Yuji Yasuda, Tokyo, Japan

[73] Assignee: Ricoh Company, Ltd., Tokyo, Japan

[21] Appl. No.: 669,458

[22] Filed: Mar. 14, 1991

[30] Foreign Application Priority Data

Mar. 15, 1990 [JP] Japan .................................. 2-62739

[51] Int. Cl.⁵ ............................................ H04N 1/21
[52] U.S. Cl. ...................................... 346/108; 359/204
[58] Field of Search ................... 346/108, 160, 139 R; 355/235; 359/197, 204, 205

[56] References Cited

U.S. PATENT DOCUMENTS

| | | | |
|---|---|---|---|
| 4,819,019 | 4/1989 | Egawa et al. | 355/3 |
| 5,001,499 | 3/1991 | Waragai et al. | 346/160 |

*Primary Examiner*—Mark J. Reinhart
*Attorney, Agent, or Firm*—Oblon, Spivak, McClelland, Maier & Neustadt

[57] ABSTRACT

A laser writing device for a laser printer or similar image forming equipment which steers two laser beams by one rotary polygonal mirror to a first and a second writing position defined on one or two photoconductive elements for thereby electrostatically forming latent images thereon. The first and second positions are set up to satisfy a particular condition.

6 Claims, 7 Drawing Sheets

LASER WRITING DEVICE FOR IMAGE FORMING EQUIPMENT

BACKGROUND OF THE INVENTION

The present invention relates to a laser writing device for image forming equipment of the type using an electrophotographic procedure and, more particularly, to a laser writing device capable of producing high quality images by reducing irregularities in writing position.

A laser writing device is one of conventional image writing devices applicable to the above-mentioned type of image forming equipment. A laser printer, for example, belongs to a family of image forming equipment implemented with a laser writing device. Specifically, a conventional laser printer has a single polygonal mirror for steering two independent laser beams. The two laser beams steered by the polygonal mirror each is routed through a particular f-theta lens and a plurality of successive mirrors to reach a particular position on an image carrier which is implemented as a photoconductive element. As a result, latent images are electrostatically formed on different positions of the photoconductive element. The problem with such a conventional laser writing device is as follows. Assume that the configuration of the mirror surfaces of the polygonal mirror is inaccurate, i.e., each reflecting surface of the mirror is inclined and cannot reflect the incident laser beam in an expected direction, or that the rotation of the polygonal mirror is not stable due to eccentricity, for example. Then, the positions on the photoconductive element to which the scanning beams are incident, i.e., writing positions are deviated to affect the quality of resultant images critically.

SUMMARY OF THE INVENTION

It is therefore an object of the present invention to provide a laser writing device for electrophotographic image forming equipment which insures high quality images by reducing the irregularities in the writing positions of a photoconductive element to which laser beams steered by a rotary polygonal mirror are incident.

It is another object of the present invention to provide a generally improved laser writing device for electrophotographic image forming equipment.

In accordance with the present invention, a laser writing device for image forming equipment which develops a latent image electrostatically formed on a single photoconductive element and transfers the resulted toner image to a recording medium comprises a first and a second laser oscillating device for emitting a first and a second laser beam, respectively, a single rotatable polygonal mirror for reflecting and steering the first and second laser beams incident thereto produce a first and a second scanning beam, a first and second optics for conducting respectively the first and second scanning beams to a first and a second writing position on the photoconductive element to electrostatically form latent images on thereon, and a writing position setting device for setting the first and second writing positions on the photoconductive element such that, assuming that a distance from any transfer position of the recording medium is positive on an upstream side and negative on a downstream side with respect to an intended direction of transport of the recording medium and that a difference between a distance between the transfer position and the first writing position and a distance between the transfer position and the second writing position is $\Delta L$, the difference $\Delta L$ satisfies an equation:

$$\Delta L = \left(N + \frac{\theta d}{360}\right) \times \frac{I}{A} \text{ (mm)}$$

where N is an integer, $\theta d$ is an angle which the polygonal mirror rotates from the beginning of steering of the first laser beam to the beginning of steering of the second laser beam, I is the number of mirror surfaces of the polygonal mirror, and A is a writing density (dot/mm) in a subscanning direction.

Also, in accordance with the present invention, a laser writing device for image forming equipment which develops latent images each being electrostatically formed on respective one of a first and a second photoconductive element and transfers the resulted toner images to a recording medium comprises a first and a second laser oscillating device for emitting a first and a second laser beam, respectively, a single rotatable polygonal mirror for reflecting and steering the first and second laser beams incident thereto to produce a first and a second scanning beam, first and second optics for conducting respectively the first and second scanning beams to a first and a second writing position on the first and second photoconductive elements, respectively, to electrostatically form latent images, and a writing position setting device for setting the first and second writing positions on the first and second photoconductive elements such that, assuming that a distance from any transfer position of the recording medium is positive on an upstream side and negative on a downstream side with respect to an intended direction of transport of the recording medium and that a difference between a distance between the transfer position and the first writing position on the first photoconductive element and a distance between the transfer position and the second writing position on the second photoconductive element is $\Delta L$, the difference $\Delta L$ satisfies an equation:

$$\Delta L = \left(N + \frac{\theta d}{360}\right) \times \frac{I}{A} \text{ (mm)}$$

where N is an integer, $\theta d$ is an angle which the polygonal mirror rotates from the beginning of steering of the first laser beam to the beginning of steering of the second laser beam, I is the number of mirror surfaces of the polygonal mirror, and A is a writing density (dot/mm) in a subscanning direction.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
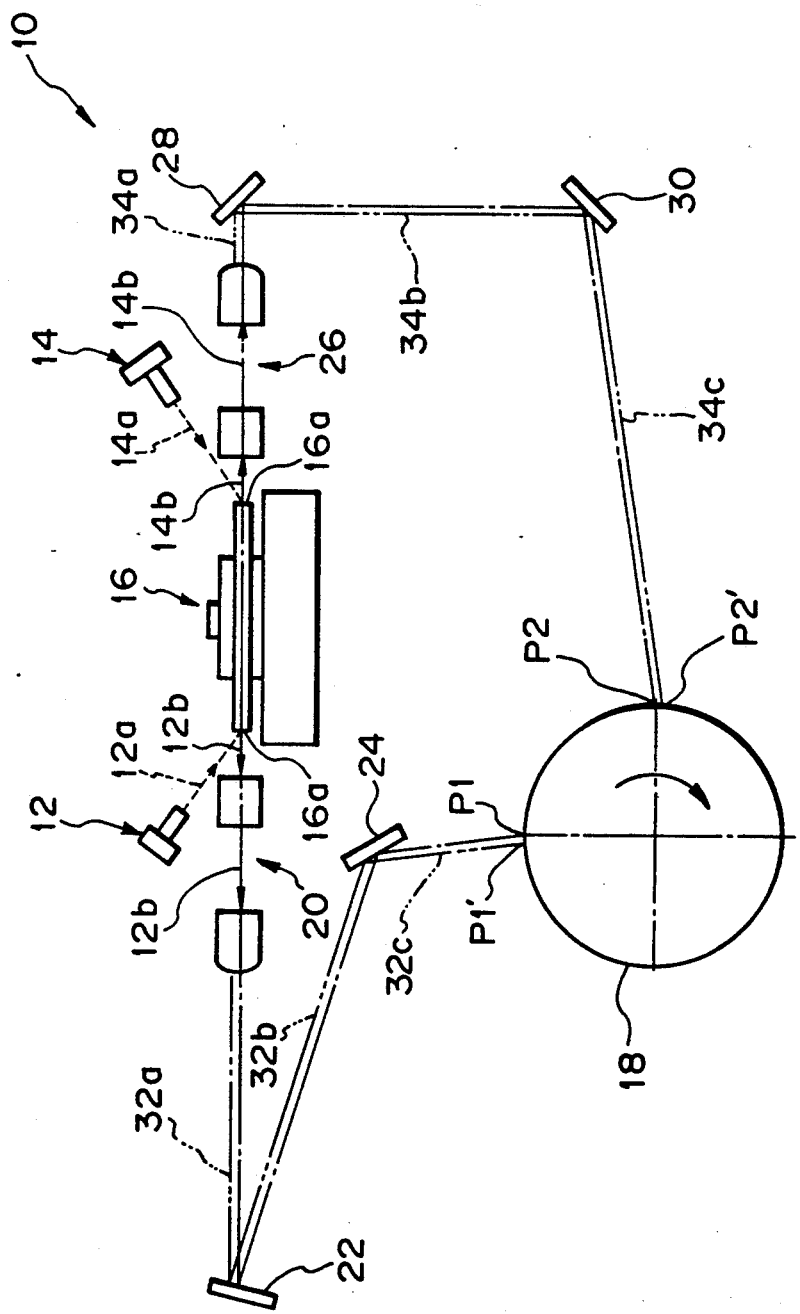
FIG. 1 is a side elevation of a conventional laser writing device incorporated in a laser printer.

To better understand the present invention, a brief reference will be made to a prior art laser writing device, shown in FIG. 1. The laser writing device, generally 10, is incorporated in a laser printer by way of example and has a first and a second laser oscillating device 12 and 14. The laser oscillating devices 12 and 14 emit a first and a second laser beam 12a and 14a, respectively. A rotary polygonal mirror 16 is rotatable while reflecting the laser beams 12a and 14a with mirror surfaces thereof. A first f-theta lens system 20 focuses the resulted first scanning beam 12b from the polygonal mirror 16 onto a first regular writing position P1 of a photoconductive element, or image carrier, 18 via mirrors 22 and 24. A second f-theta lens system 26 and mirrors 28 and 30 cooperate to focus the second scanning beam 14b from the polygonal mirror 16 onto a second regular writing position P2 of the photoconductive element 18. Assume that mirror surfaces 16a constituting the polygonal mirror 16 are inclined and, therefore, fail to reflect the laser beams 12a and 14a accurately. Then, the laser beams 12a and 14a reflected by the mirror surfaces 16a are respectively incident to positions P1' and P2' which are deviated from the regular writing positions P1 and P2. Specifically, the scanning beam 12b reaches the position P1' upstream of the regular position P1 with respect to the direction of rotation of the photoconductive element 18 by way of unexpected optical paths 32a, 32b and 32c. On the other hand, the scanning beam 14b reaches the position P2' downstream of the regular position P2 by way of unexpected optical paths 34a, 34b and 34c. In this manner, the laser beams 12b and 14b are deviated in opposite directions to each other. This stems from the fact that both of the laser beams 12a and 14a are reflected by the same number of mirrors, i.e. two mirrors. Such deviations prevent images from having desirable quality.

Figure 2:
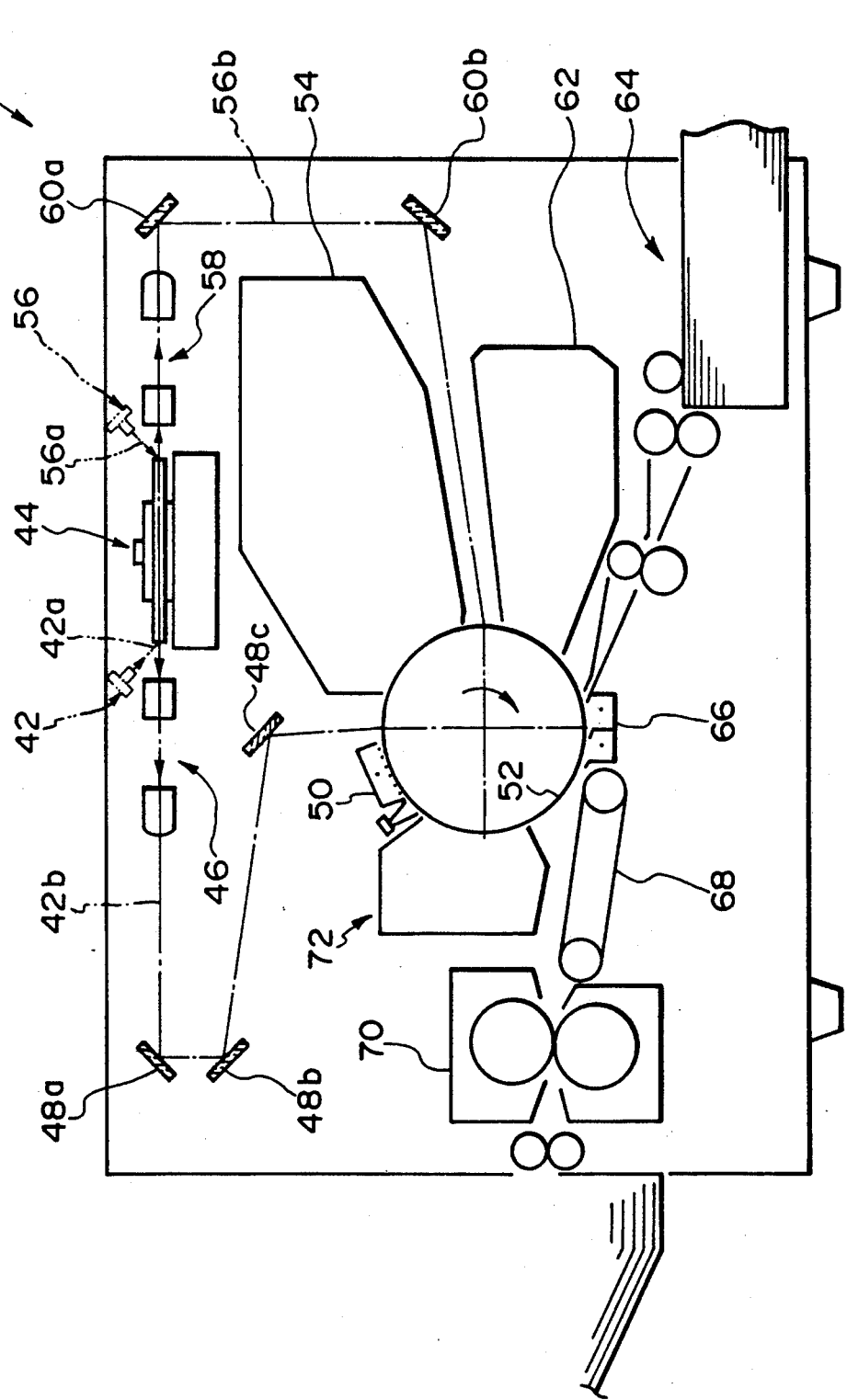
FIG. 2 is a sectional side elevation showing the general construction of a laser printer to which the present invention is applicable.

Referring to FIG. 2, a laser printer belonging to a family of image forming equipment to which the present invention is applicable is shown and generally designated by the reference numeral 40. As shown, the laser printer 40 has a first laser oscillating device 42 emitting a first laser beam 42a. The laser beam 42a is reflected by a rotary polygonal mirror 44 and then propagated through a first f-theta lens system 46. The laser beam 42a coming out of the lens system 46 is sequentially reflected by an odd number of mirrors, e.g., three mirrors 48a, 48b and 48c to scan a photoconductive element 52 which is implemented as a drum. At this instant, the surface of the drum 52 has been uniformly charged by a charger 50. As a result, a first latent image is electrostatically formed on the drum 52. A first developing unit 54 develops the latent image to produce a corresponding toner image. A second laser beam 56a issuing from a second laser oscillating device 56 is reflected by the polygonal mirror 44 in the opposite direction to the first laser beam 42a to reach a second f-theta lens system 58. The laser beam 56a propagated through the lens system 58 is sequentially reflected by an even number of mirrors, e.g., two mirrors 60a and 60b and then incident to the drum 52 at a position downstream of the developing unit 54. The resulted second latent image is developed by a second developing unit 62. The developed image or images are transferred by a transfer and separation unit 66 to a recording medium in the form of a paper sheet, not shown, which is fed from a paper feeding device 64. The paper sheet carrying the image thereon is transported by a transporting device 68 to a fixing unit 70 to fix the image. Thereafter, the paper sheet is driven out of the laser printer 40. After the image transfer, a cleaning unit 72 cleans the surface of the drum 44 while dissipating a charge remaining thereon and thereby restores it to the initial condition. Assume that the developing units 54 and 62 implement respectively development in black and development in color such as red or blue, and that the developing unit 54 has a greater capacity than the developing unit 62. If the second laser beam 56a is used to write additional information such as overlay data, the associated developing unit 62 may share the same color as the developing unit 54. The first and second writing positions on the drum 52 to which the first and second scanning beams 42b and 56b are respectively incident are selected such that the polygonal mirror 44 steer the beams 42b and 56b to the same position on a recording medium with the same surface thereof. To prevent different colors from being mixed, control is effected such that the scanning beam 56b does not overwrite data in a position where the scanning beam 42b has written data.

Figure 3:
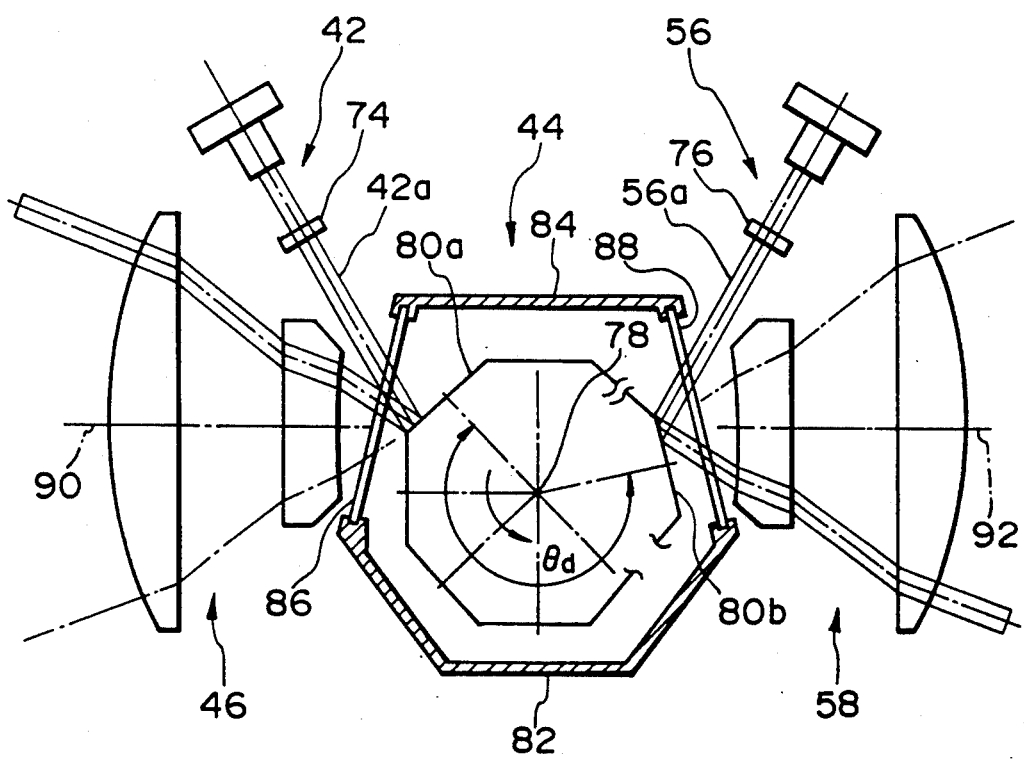
FIG. 3 is a plan view showing a rotary polygonal mirror and associated elements which constitute a laser writing device included in the laser printer of FIG. 2.

FIG. 3 shows the polygonal mirror 44 and its associated elements as viewed from the above. As shown, the first laser oscillating device 42 has a cylindrical lens 74 for controlling the diameter of the laser beam 42a while the second laser oscillating device 56 has a cylindrical lens 76 for controlling the diameter of the laser beam 56a. The first and second f-theta lens systems 46 and 58 control respectively the first and second laser oscillating devices 42 and 56 and their output beams and are located symmetrically to each other with respect to the axis of the polygonal mirror 44. The laser beams 42a and 56a are reflected by the polygonal mirror 44 in opposite directions to each other. After a given surface 80a of the polygonal mirror 44 has steered the laser beam 42a, it begins to steer the laser beam 56a on completing a θd degrees of angular movement. Brackets 82 and 84 are arranged around the polygonal mirror 44. Transparent soundproof glasses 86 and 88 are so located as to transmit the associated laser beams therethrough. The brackets 82 and 84 and glasses 86 and 88 hermetically isolate the polygonal mirror 44 to insulate noise ascribable to the rotation of the mirror 44 and to prevent dust and other impurities from reaching the mirror 44. The laser oscillating device 42 and f-theta lens system 46 and the laser oscillating device 56 and f-theta lens system 58 may be positioned symmetrically with respect to the center of rotation 78 of the polygonal mirror 44. Such a point-symmetrical arrangement, however, deviates the scanning centers 90 and 92 of the laser beams and thereby reduces the effective scanning ratio, resulting in the need for a bulky device for a given effective width. In addition, the point symmetry greatly differs from the line symmetry with respect to the time from the beginning of scanning to the effective writing and, therefore, needs complicated circuitry including a timing circuit.

Figure 4:
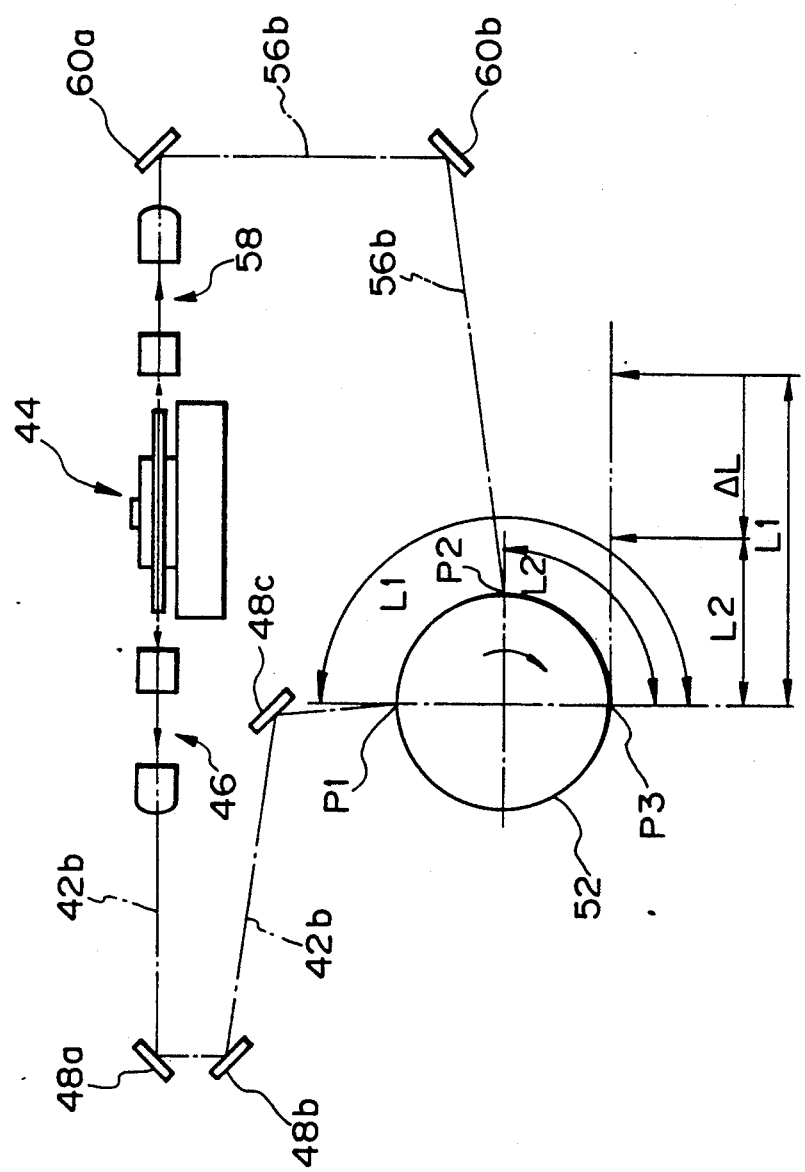
FIG. 4 is a side elevation showing a laser writing device embodying the present invention.

Referring to FIG. 4, a laser writing device embodying the present invention is shown which writes data on a single photoconductive element. As shown, the first and second scanning beams 42b and 56b reflected by the polygonal mirror 44 are respectively incident to a first and a second position P1 and P2 of the drum 52. The resulted latent images are respectively developed by a first and a second developing unit, not shown, to produce toner images. The toner images are transferred to a recording medium, not shown, at a transfer position P3. The polygonal mirror 44 steers the incident laser beams 42a and 56a with the same surface thereof in such a manner as to write data in the same position of the recording medium, as follows. Assume that the angular distance (circumferential distance) between the transfer position P3 and the first writing position P1 and L1, the angular distance (circumferential distance) between the transfer position P3 and the second writing position P2 is L2, and the difference between the angular distances L1 and L2 is ΔL. Further, assume that the writing density in the subscanning direction is A (dot/mm), the polygonal mirror 44 has I mirror surfaces and rotates at a rate of I dots per rotation, and the angular distance between a position where the mirror 44 starts scanning the first laser beam and a position where it starts scanning the second laser beam is θd degrees (see FIG. 3). Then, the first and second writing positions P1 and P2 are selected to satisfy an equation:

$$\Delta L = L1 - L2 = \left(N + \frac{\theta d}{360}\right)\frac{I}{A} \text{ [mm]} \quad \text{Eq. (1)}$$

where N is the integer.

Figure 5:
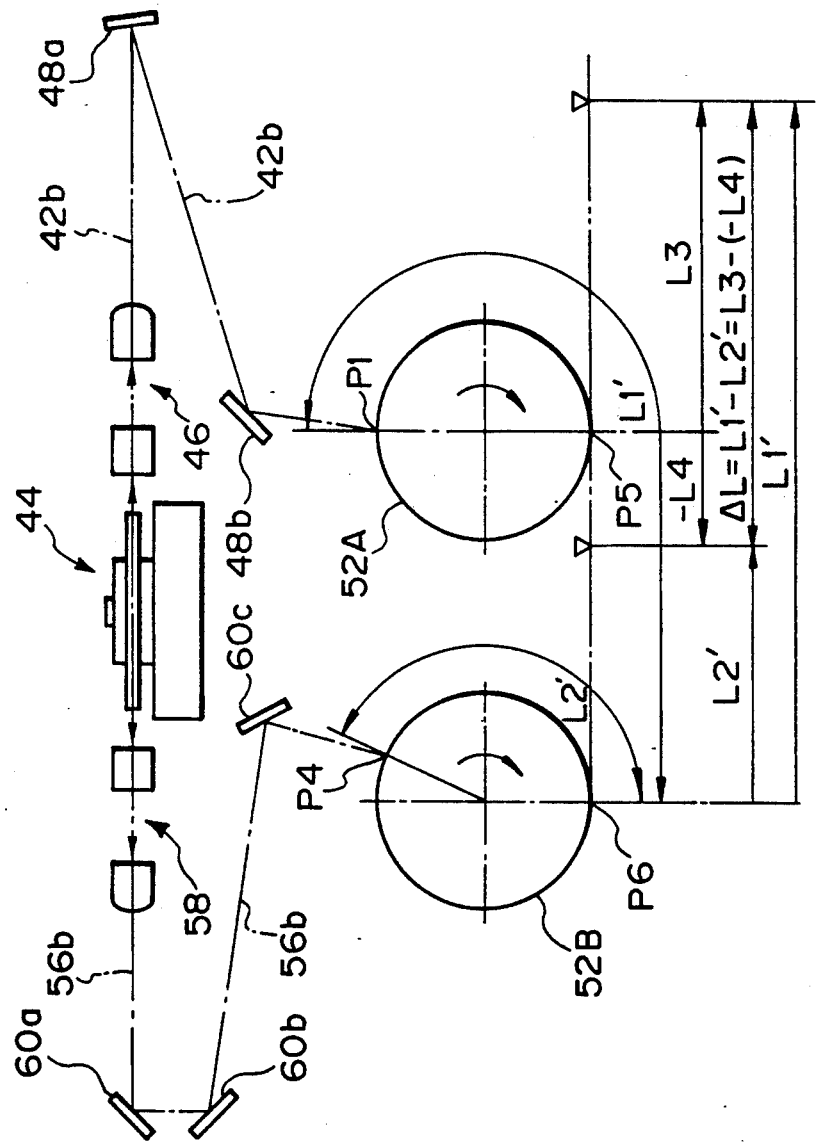
FIG. 5 is a side elevation showing a modification of the embodiment shown in FIG. 4.

FIG. 5 shows a modification of the above embodiment which is constructed to write data on a plurality of photoconductive elements. In this embodiment, the laser beams 42a and 56 shown in FIG. 4 are replaced with each other. The laser beams 42b' and 56b reflected by the polygonal mirror 44 are respectively incident to the first writing position P1 defined on a first drum 52A and a second writing position P4 defined on a second drum 52B. The latent images formed on the drums 52A and 52B at the positions P1 and P4, respectively, are developed by particular developing units, not shown, and then sequentially transferred to a recording medium, not shown, at a first and a second transfer positions P5 and P6, respectively. The images formed by the same surface of the polygonal mirror 44 are transferred to the same position of a recording medium, as follows. Consider the distances between the transfer positions P5 and P6 and their associated writing positions P1 and P4 (let the upstream side and the downstream side be positive and negative, respectively).

Assume that the second transfer position P6 is used as a reference and is spaced apart from the first and second writing positions P1 and P4 by distances L1' and L2', respectively, and the difference (circumferential distance) is ΔL. Then, the difference ΔL is expressed as:

$$\Delta L = L1' - L2' = \left(N' + \frac{\theta d'}{360}\right)\frac{I}{A} \text{ [mm]} \quad \text{Eq. (2)}$$

where N' is an integer and θd' is equal to 360−θd (supplementary to θd, FIG. 3, since the laser beams 42a and 56a are replaced with each other).

On the other hand, assume that the first transfer position P5 is a reference and is spaced apart from the first and second writing positions P1 and P6 by L3 and −L4 (downstream side; L4 being equal to or greater than zero), respectively, and the difference in terms of circumferential distance is ΔL. Then, the difference ΔL is produced by:

$$\Delta = L3 - (-L4) = L3 + L4$$

Then, as shown in FIG. 5, there holds an equation ΔL=L1'−L2'=L3+L4 which is equivalent to the Eq. (2).

As a result, images derived from the same surface of the polygonal mirror 44 will be transferred to the same position of a recording medium if the difference ΔL between the distances between the transfer positions P5 and P6 and the writing positions P1 and P4 is so selected as to satisfy an equation:

$$\Delta L = \left(N + \frac{\theta d}{360}\right)\frac{I}{A} \text{ [mm]} \quad \text{Eq. (3)}$$

where N is a suitable integer, I is the number of mirror surfaces of the polygonal mirror 44, A is the writing density (dot/mm) in the subscanning direction, and θd is the previously mentioned angular distance (degrees) of the mirror 44.

As the Eq. (3) indicates, the writing positions P1 and P4 are set by the adjustment of the rotation speed and the number of surfaces of the polygonal mirror, or writing position setting means, 44.

Figure 6:
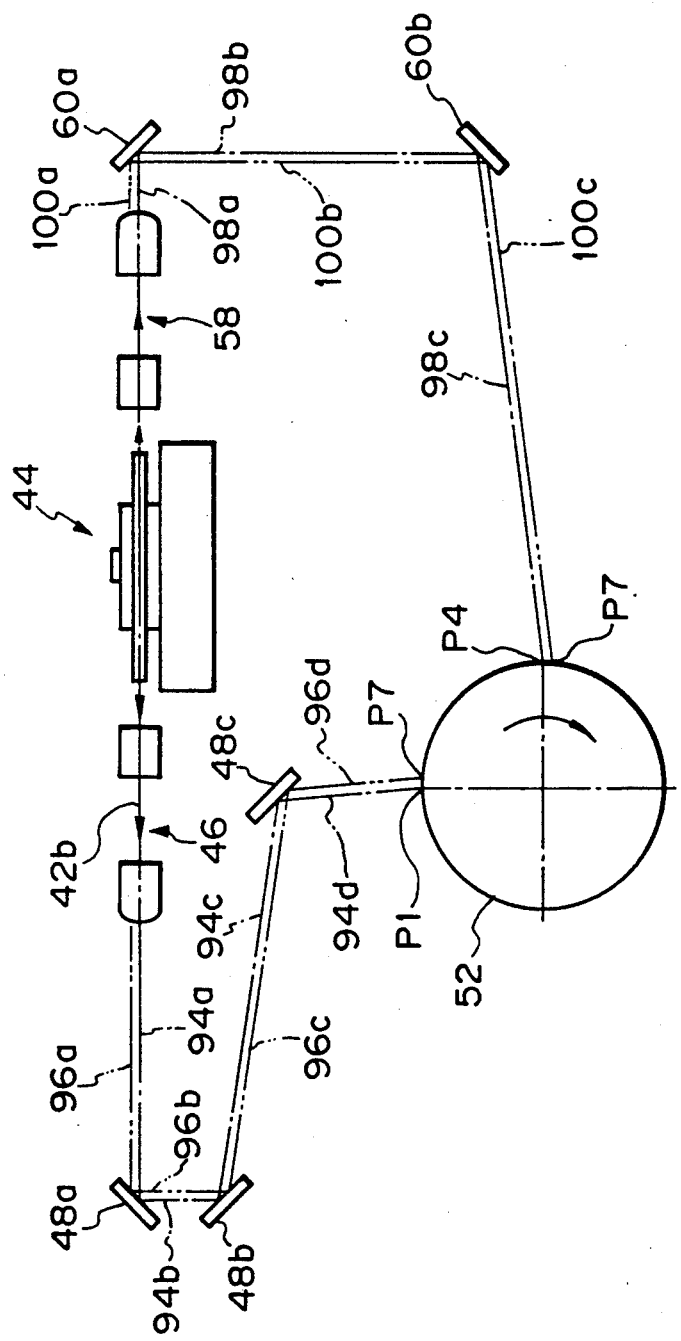
FIG. 6 is a side elevation showing an alternative embodiment of the present invention.

Referring to FIG. 6, an alternative embodiment of the present invention is shown which uses an even number of mirrors in steering one laser beam toward a single photoconductive drum and an odd number of mirrors for steering the other laser beam. As shown, the scanning beam 42b from the polygonal mirror 44 is expected to be sequentially steered by three mirrors 48a, 48b and 48c along regular optical paths 94a, 94b, 94c and 94d to reach the first writing position P1 on the drum 52. Assuming that the reflection of the laser beam 42a by the polygonal mirror 44 is inclined upward due to the configuration of the mirror 44, the scanning beam 42b is steered by the mirrors 48a, 48b and 48c along deviated optical paths 96a, 96b, 96c and 96d to reach a position P7 downstream of the position P1. Likewise, the other scanning beam 56b from the polygonal mirror 44 is sequentially reflected by two mirrors 60a and 60b along regular optical paths 98a, 98b and 98c to reach the second writing position P4 on the drum 52. However, when the reflection of the laser beam 56b is inclined upward, the beam 56b is steered by the mirrors 60a and 60b along deviated optical paths 100a, 100b and 100c to reach a position P7 downstream of the expected position P4. When a given surface of the polygonal mirror 44 is inclined, the above-stated even number of mirrors and odd number of mirrors are successful in causing both the first laser beam 42a and the second laser beam 56a to become incident to the drum 52 at positions which are deviated in the same direction from the regular positions P1 and P2. Such an effect is also achievable when the even number of mirrors and the odd number of mirrors are replaced with each other.

It will be seen that this embodiment substantially halves the writing error, compared to the prior art shown in FIG. 1, and compensates for the eccentricity of the polygonal mirror 44 as well. The distance between the writing positions assigned to the first and second scanning beams 42b and 56b may be so selected as to irradiate the same position of the drum 52 by the same surface of the polygonal mirror 44 in order to further enhance the above advantages.

Figure 7:
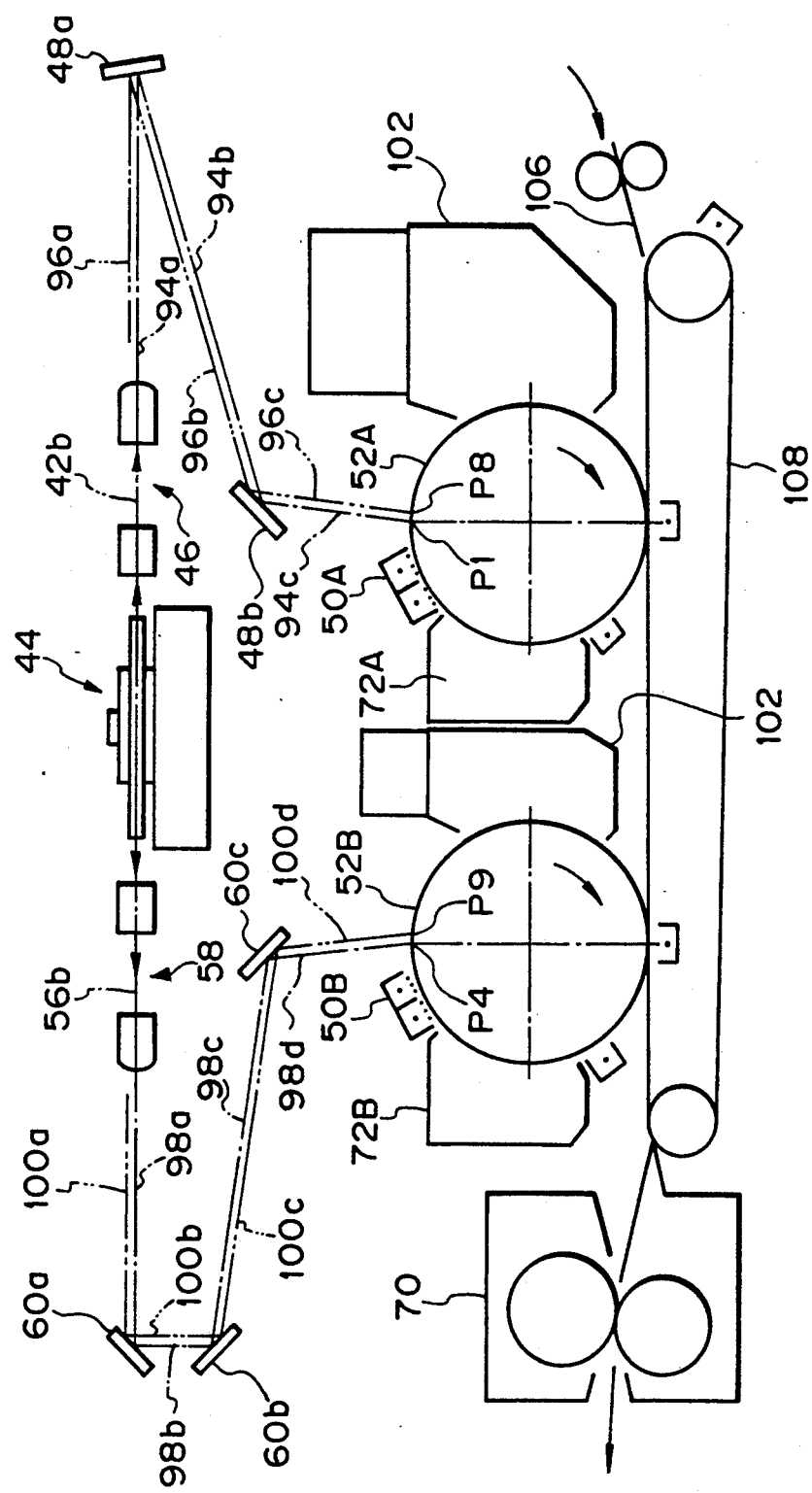
FIG. 7 is a side elevation showing a modification of the embodiment depicted in FIG. 6.

FIG. 7 shows a modification of the embodiment described above with reference to FIG. 6. As shown, the scanning beam 42b from the polygonal miror 44 is routed through the first f-theta lens system 46 and two mirrors 48a and 48b to reach one drum 52A. The other scanning beam 56b is routed through the second f-theta lens system 58 and three mirrors 60a, 60b and 60c to reach the other drum 53B. Associated with the drums 52A and 52B are, respectively, developing units 102 and 104, cleaning units 72A and 72B, and chargers 50A and 50B. A recording medium in the form of a paper sheet 106 is fed from a paper feeding device, not shown, and transported by a belt 108 while being electrostatically retained thereon. Toner images formed on the drums 52A and 52B are sequentially transferred to the paper sheet and then fixed by the fixing unit 70. When the scanning beam 42b is inclined, it is propagated through the optical paths 96a, 96b and 96c to reach a position P8 downstream of the first regular writing position P1. Likewise, when the scanning beam 56b is inclined, it is propagated through the optical paths 100a, 100b, 100c and 100d to reach a position P9 downstream of the second regular writing position P4. As a result, the difference between the two writing positions is reduced, as in the embodiment of FIG. 6. Again, the first and second writing positions P1 and P4 and the first and second drums 52A and 52B may be so arranged as to transfer the toner images formed by the same surface of the polygonal mirror to the same position on the paper sheet 106.

In summary, in accordance with the present invention, images scanned by the same surface of the polygonal mirror are transferred to the same position of a recording medium if a first and a second writing position where a first and second laser beam write image data are so set up as to satisfy the Eq. (3). Hence, the present invention minimizes irregularities in writing position ascribable to the inaccurate configuration of the polygonal mirror and rotation-by-rotation oscillation, insuring high quality images with a minimum of irregularity.

Further, one of two optics has an odd number of mirrors while the other has an even number of mirrors. Such a unique arrangement is successful in deviating, when the surface configuration of the polygonal mirror is inaccurate, both of the first and second scanning beams in the same direction from their associated writing positions. Therefore, the present invention substantially halves the writing error, compared to a conventional device.

Various modifications will become possible for those skilled in the art after receiving the teachings of the present disclosure without departing from the scope thereof.

What is claimed is:

1. A laser writing device for image forming equipment which develops a latent image electrostatically formed on a single photoconductive element and transfers a resulted toner image to a recording medium, said device comprising:
   a first and second laser oscillating means for emitting a first and a second laser beam, respectively;
   a single rotatable polygonal mirror for reflecting and steering said first and second laser beams incident thereto to produce a first and a second scanning beam;
   first and second optics for conducting respectively said first and second scanning beams to a first and a second writing position on the photoconductive element to electrostatically form latent images on said photoconductive element; and
   writing position setting means for setting said first and second writing positions on the photoconductive element such that, assuming that a distance from any transfer position of the recording medium is positive on an upstream side and negative on a downstream side with respect to an intended direction of transport of said recording medium and that a difference between a distance between said transfer position and said first writing position and a distance between said transfer position and said second writing position is ΔL, said first and second writing positions satisfy an equation:

$$\Delta L = \left( N + \frac{\theta d}{360} \right) \times \frac{1}{A} \text{ (mm)}$$

where N is an integer, $\theta d$ is an angle which said polygonal mirror rotates from the beginning of steering of said first laser beam to the beginning of steering of said second laser beam, I is the number of mirror surfaces of said polygonal mirror, and A is a writing density (dot/mm) in a subscanning direction.

2. A device as claimed in claim 1, wherein said first and second optics each comprises a single f-theta lens and a plurality of mirrors.

3. A device as claimed in claim 2, wherein one of said first and second optics comprises an even number of mirrors while the other comprises ann odd number of mirrors.

4. A laser writing device for image forming equipment which develops latent images each being electrostatically formed on respective one of a first and a second photoconductive element and transfers resulted toner images to a recording medium, said device comprising:
   first and second laser oscillating means for emitting a first and a second laser beam, respectively;
   a single rotatable polygonal mirror for reflecting and steering said first and second laser beams incident thereto to produce a first and a second scanning beam;
   first and second optics for conducting respectively said first and second scanning beans to a first and second a first and a second writing position on said first and second photoconductive element, respectively, to electrostatically form latent images; and
   writing position setting means for setting said first and second writing positions on the first and second photoconductive elements such that, assuming that a distance from any transfer position of the recording medium is positive on an upstream side and negative on a downstream side with respect to an intended direction of transport of said recording medium and that a difference between a distance between said transfer position and said first writing position on said first photoconductive element and a distance between said transfer position and said second writing position on said second photoconductive element is ΔL, said first and second writing positions satisfy an equation:

$$\Delta L = \left(N + \frac{\theta d}{360}\right) \times \frac{I}{A} \text{ (mm)}$$

where N is an integer, $\theta d$ is an angle which said polygonal mirror rotates from the beginning of steering of said first laser beam to the beginning of steering of said second laser beam, I is the number of mirror surfaces of said polygonal mirror, and A is a writing density (dot/mm) in a subscanning direction.

5. A device as claimed in claim 4, wherein said first and second optics each comprises a single f-theta lens and a plurality of mirrors.

6. A device as claimed in claim 5, wherein one of said first and second optics comprises an even number of mirrors while the other comprises an odd number of mirrors.

* * * * *